Aug. 9, 1966        G. W. DIGGENS        3,264,708

HERMETICALLY SEALED CAPACITOR

Filed Oct. 1, 1962

*INVENTOR.*
GEORGE W. DIGGENS
BY *Connolly and Hutz*
HIS ATTORNEYS

United States Patent Office 3,264,708
Patented August 9, 1966

3,264,708
HERMETICALLY SEALED CAPACITOR
George W. Diggens, North Adams, Mass., assignor to Sprague Electric Company, North Adams, Mass., a corporation of Massachusetts
Filed Oct. 1, 1962, Ser. No. 227,212
4 Claims. (Cl. 29—25.31)

This invention relates to hermetically sealed capacitors, and more particularly to a process for forming such capacitors utilizing glass-to-metal end seals.

In the formation of a hermetically sealed electrolytic capacitor wherein the sealing is accomplished by welding, it is essential to a perfect seal that the areas to be welded be free of all foreign matter and be in a moisture free atmosphere. Heretofore, in the formation of capacitors of this type, the presence of the electrolyte during welding made it extremely difficult to consistently obtain a true hermetic seal. Moreover, the use of dissimilar metals in the presence of an electrolyte resulted in corrosive galvanic action.

It is an object of this invention to overcome the foregoing and related problems.

It is another object to provide a hermetically sealed electrolytic capacitor.

It is yet another object to present a process for forming a hermetically sealed capacitor.

It is still another object to present a process wherein the seal is effected in the absence of electrolyte.

These and other objects will become apparent from the description of the invention when read in conjunction with the accompanying drawing, wherein.

Broadly stated, the invention is concerned with the welding of a glass-to-metal seal to both ends of a capacitor casing in the absence of moisture and/or electrolyte and the subsequent impregnation of the capacitor with an electrolyte. The impregnation is effected by means of a tube or pipette inserted through a hole or port near one end of the casing. Subsequently the hole or port is closed by welding with the same metal as the casing.

Figure 1:
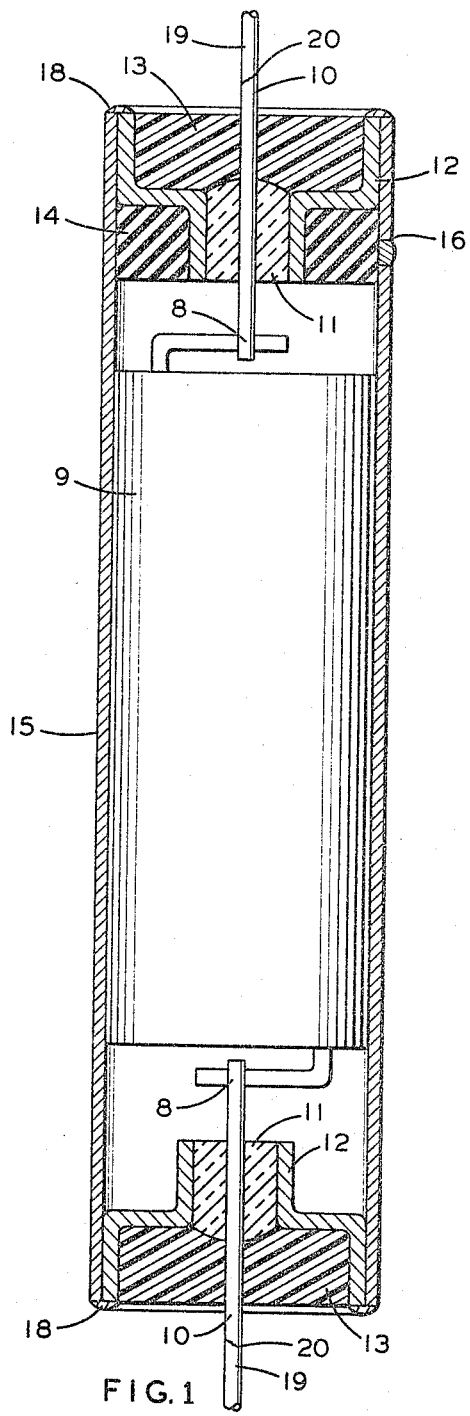
FIGURE 1 is a sectional view of a completed capacitor formed by the process of this invention.

The features and details of the construction shown in the drawing and the process by which it is formed are as follows: A glass-to-metal seal is lap-welded at 8 to each end of a rolled capacitor section 9. The glass-to-metal seal comprises a tantalum lead wire 10 which has a mass of glass 11 surrounding and fused to a section thereof; the glass, in turn, being surrounded by and fused to a metal collar 12. Positioned about the external lead wire of the seal at a point adjacent the glass is a mass of a synthetic resin 13. This resin eliminates the possibility of bending at the glass surface which could cause the glass to fracture. Prior to lap-welding the glass-to-metal seal to the capacitor section, a rubber (natural or synthetic) ring 14 is positioned in tight-fit relationship, about the neck of one of the glass-to-metal seals. The function of this ring will be elaborated on below. A metal capacitor casing 15 is provided with small hole or port 16 (shown already sealed in FIGURE 1) near one end of the casing, in the region which contacts rubber ring 14.

Figure 2:
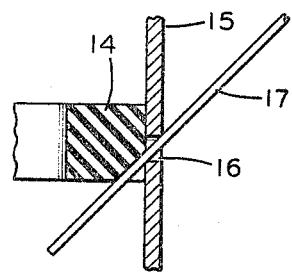
FIGURE 2 is a fragmentary sectional view of the electrolyte-filling port of the capacitor with filling pipette protruding therethrough.
Figure 3:
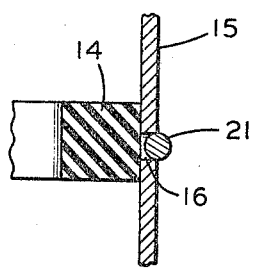
FIGURE 3 is a fragmentary sectional view of the electrolyte-filling port with a closure ball recessed therein.

In assembling the capacitor, the foil section 9, with seals attached, is inserted into the casing 15 to a point where the space between the end of foil section 9 and rubber ring 14 is opposite port 16. A metal tube or pipette 17 in inserted through port 16 and into the space between the section and the rubber ring. The section and the seals are then pushed into final position within the case so that the rubber ring presses against the pipette in the manner shown in FIGURE 2. The seals are welded at 18 to the ends of casing 15. The capacitor unit is next submerged in an electrolyte and vacuum impregnated. With the pipette still in position the unit is pre-aged to put an oxide formation on the lap-welded joint and the lead-wire. The pipette will permit the gas formed during oxidation to escape. Vacuum is used to remove excess electrolyte. The pipette is then withdrawn—the rubber ring sealing off hole or port 16 from the electrolyte and water vapor—and the hole or port closed as by welding. FIGURE 3 illustrates the preferred method of effecting the closure. A ball 21 of the same metal as the casing is inserted in port 16 and flash welded. By using the same metal the possibility of galvanic action is eliminated. As a final step, solderable lead-wires 19 are butt-welded at 20 to the tantalum lead-wires.

As an alternative step of inserting the electrolyte-filling pipette, the capacitor section with seals attached is placed into position within casing 15 and welded thereto. Next the pipette is inserted through filling-port 16, piercing rubber ring 14 and extending within the space between said rubber ring and the top of section 12. The capacitor is vacuum impregnated with an electrolyte and pre-aged to place an oxide formation on the lead wires and the lap-welded area. Excess electrolyte is removed from the capacitor through the pipette by means of vacuum. Thereafter, the pipette is pulled out of the filling port, the pierced rubber closing tightly to prevent the escape of electrolyte. By this method there is greater assurance that the filling hole or port is free from electrolyte and dry, enabling an effective closure of the hole by welding.

Impregnation by means of a vacuum is preferred, however, under certain circumstances it may be accomplished at normal or under a positive pressure.

The present invention is not limited to tantalum foil capacitors but extends to other valve metals such as aluminum, niobium, etc. The capacitor sections need not be foil but may be of the pellet type. The metal employed for the casing and the collar of the glass may be of any suitable metal as steel, the Kovar alloys, etc. The electrolyte can be any of the conventional ones known to the art and used with the different capacitors mentioned above.

The rubber ring must be chemically compatible with the electrolyte employed. It may be natural rubber or a synthetic rubber, such as, a copolymer of ethylene and propylene.

The synthetic resin which protects the glass-to-metal bond and prevents fracture of the glass can be any suitable dielectric resin, e.g., an epoxy resin.

As is evident from the foregoing, the invention is not to be limited to formation of the rather specific illustrative device. Modifications and variations, as well as the substitution of equivalents may be made without departing from the spirit of the invention as defined in the appended claims.

What is claimed is:

1. A process for forming a hermetically sealed electrolytic capacitor comprising welding at least one glass-to-metal seal to a capacitor section, there being a rubber ring positioned at one end of this assembly between said section and the seal, said seal comprising a mass of glass surrounding and fused to a metal lead wire and surrounded by and fused to a metal collar; providing a small hole near one end of a metal capacitor casing, inserting the capacitor section into the casing to a point where the space between the end of the section and the rubber ring is opposite said small hole; inserting the end of a pipette through said hole and into said space; pushing the section and seal into final position and welding the seal to the casing; impregnating the capacitor unit with an electrolyte through said pipette; pre-aging the capacitor to oxidize the welded joint and internal lead; removing the pipette and closing the hole by welding with the same metal as the casing.

2. A process for forming a hermetically sealed electrolytic capacitor comprising welding a glass-to-metal seal to each end of a rolled tantalum capacitor section, there being a rubber ring positioned at one end of this assembly between said section and the seal, said seal comprising a mass of glass surrounding and fused to a tantalum lead wire and surrounded by and fused to a metal collar; positioning a mass of a synthetic resin about the external lead of the seal at a point adjacent the glass; providing a small hole near one end of a metal capacitor casing, inserting the capacitor section into the casing to a point where the space between the end of the section and the rubber ring is opposite said small hole; inserting the end of a pipette through said hole and into said space; pushing the section into final position and welding the seals to the casing; vacuum impregnating the capacitor with an electrolyte through said pipette; pre-aging the capacitor to oxidize the welded joint and internal lead; removing the pipette and closing the hole by welding with the same metal as the casing.

3. A process for forming a hermetically sealed electrolytic capacitor comprising welding at least one glass-to-metal seal to a capacitor section; there being a rubber ring positioned at one end of this assembly between said section and the seal, said seal comprising a mass of glass surrounding and fused to a metal lead wire and surrounded by and fused to a metal collar; providing a small hole near one end of a metal capacitor casing, inserting the assembly into the casing to a point where the rubber ring closes the small hole; welding the seal to the casing; inserting the end of a pipette through the small hole, piercing the rubber ring and extending into the space between the end of said section and the rubber ring; impregnating the capacitor with an electrolyte through said pipette; pre-aging the capacitor to oxidize the welded joints and internal leads; removing excess electrolyte; removing the pipette and closing the hole by welding with the same metal as the casing.

4. A process for forming a hermetically sealed electrolytic capacitor comprising welding a glass-to-metal seal to each end of a rolled tantalum capacitor section, there being a rubber ring positioned at one end of this assembly between said section and the seal, said seal comprising a mass of glass surrounding and fused to a tantalum lead wire and surrounded by and fused to a metal collar; positioning a mass of a synthetic resin about the external lead of the seal at a point adjacent the glass; providing a small hole near one end of a metal capacitor casing; inserting the assembly into the casing to a point where the rubber ring closes the small hole; welding the seals to the casing; inserting the end of a pipette through the small hole, piercing the rubber ring and extending into the space between the end of said section and the rubber ring; vacuum impregnating the capacitor with an electrolyte through said pipette; pre-aging the capacitor to oxidize the welded joints and internal leads; removing excess electrolyte; removing the pipette and closing the hole by welding with the same metal as the casing.

References Cited by the Examiner

UNITED STATES PATENTS

| | | | |
|---|---|---|---|
| 2,290,163 | 7/1942 | Brennan | 317—230 |
| 2,412,201 | 12/1946 | Brennan | 29—25.31 |
| 2,628,271 | 2/1953 | Brafman | 317—230 |
| 2,987,800 | 6/1961 | Kurland et al. | 29—25.31 |
| 3,131,337 | 4/1964 | Clement | 317—230 |

JOHN F. CAMPBELL, *Primary Examiner.*

JAMES D. KALLAM, *Examiner.*

W. I. BROOKS, *Assistant Examiner.*